(12) United States Patent
Lee et al.

(10) Patent No.: US 10,055,813 B2
(45) Date of Patent: Aug. 21, 2018

(54) ELECTRONIC DEVICE AND OPERATION METHOD THEREOF

(71) Applicant: Samsung Electronics Co., Ltd., Suwon-si, Gyeonggi-do (KR)

(72) Inventors: Woo-Yong Lee, Hwaseong-si (KR); Chul-Hwan Lee, Seoul (KR); Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 14/471,756

(22) Filed: Aug. 28, 2014

(65) Prior Publication Data

US 2015/0062126 A1 Mar. 5, 2015

(30) Foreign Application Priority Data

Aug. 29, 2013 (KR) .................... 10-2013-0103307

(51) Int. Cl.
*G06T 17/00* (2006.01)
*G06T 3/20* (2006.01)
*G06T 3/00* (2006.01)
*G06F 1/16* (2006.01)
(Continued)

(52) U.S. Cl.
CPC ............. *G06T 3/20* (2013.01); *G06F 1/16* (2013.01); *G06T 3/0006* (2013.01); *H04M 1/0245* (2013.01); *H04M 1/72527* (2013.01); *H04M 1/0214* (2013.01)

(58) Field of Classification Search
CPC ... H04W 4/021; H04W 88/02; H04W 84/042; H04W 8/183; H04W 72/0446; H04W 72/048; H04L 1/0003; H04L 41/22; H04L 63/0876; H04L 63/1416; H04L 67/06; H04L 12/1886; H04N 5/2252; H04N 5/23216; H04N 19/503; H04N 2007/145; H04N 1/00469; H04N 1/00551; H04N 1/1061; G06F 3/0416; G06F 17/212; G06F 2203/04803; G06F 1/1626; G06F 2200/1633; G06F 3/04886; G06F 1/1616; G06F 3/0488; G06F 3/167; G09G 2320/08; G09G 2380/16; G09G 2370/20; G09G 5/14; H04B 1/3888; H04B 1/385; H04B 1/38; H04B 1/3877; H04M 1/0214;
(Continued)

(56) References Cited

U.S. PATENT DOCUMENTS

2009/0295731 A1* 12/2009 Kim .................... G06F 1/1616
345/168
2012/0162876 A1* 6/2012 Kim .................... H04M 1/0237
361/679.01
(Continued)

FOREIGN PATENT DOCUMENTS

KR  10-1285669 B1  7/2013

*Primary Examiner* — Xilin Guo
(74) *Attorney, Agent, or Firm* — Jefferson IP Law, LLP

(57) ABSTRACT

An electronic device including a cover having a display protection function and a method thereof are provided. The method includes acquiring at least one of context information and attribute information of an application according to whether the cover is closed and displaying an object related to the acquired information on a region which is included or is not included in a region corresponding to the cover window of a display of the electronic device.

16 Claims, 13 Drawing Sheets

(51) Int. Cl.
*H04M 1/725* (2006.01)
*H04M 1/02* (2006.01)

(58) Field of Classification Search
CPC ........... H04M 1/0266; H04M 1/72583; H04M 2250/22; G06T 7/90; G06T 3/40
See application file for complete search history.

(56) References Cited

U.S. PATENT DOCUMENTS

| | | | | |
|---|---|---|---|---|
| 2012/0212430 | A1* | 8/2012 | Jung | G06F 1/1626 |
| | | | | 345/173 |
| 2013/0300679 | A1* | 11/2013 | Oh | A45C 11/00 |
| | | | | 345/173 |
| 2014/0128131 | A1* | 5/2014 | Sin | H04M 1/185 |
| | | | | 455/575.8 |
| 2014/0333831 | A1* | 11/2014 | Oh | H04N 5/2254 |
| | | | | 348/376 |

* cited by examiner

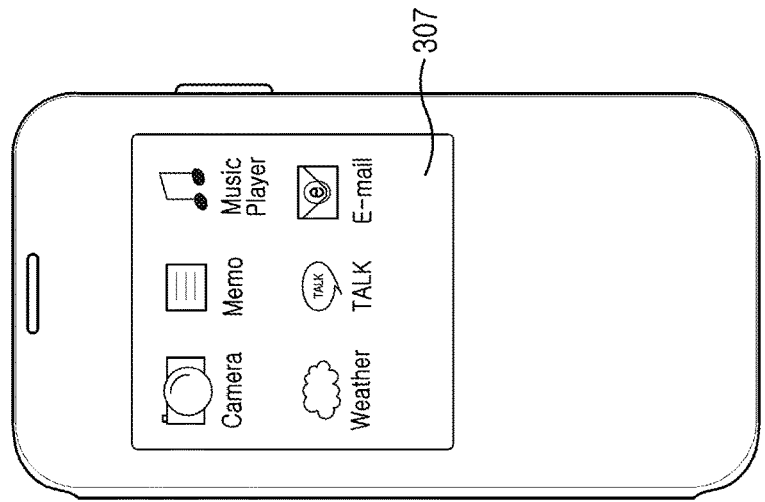
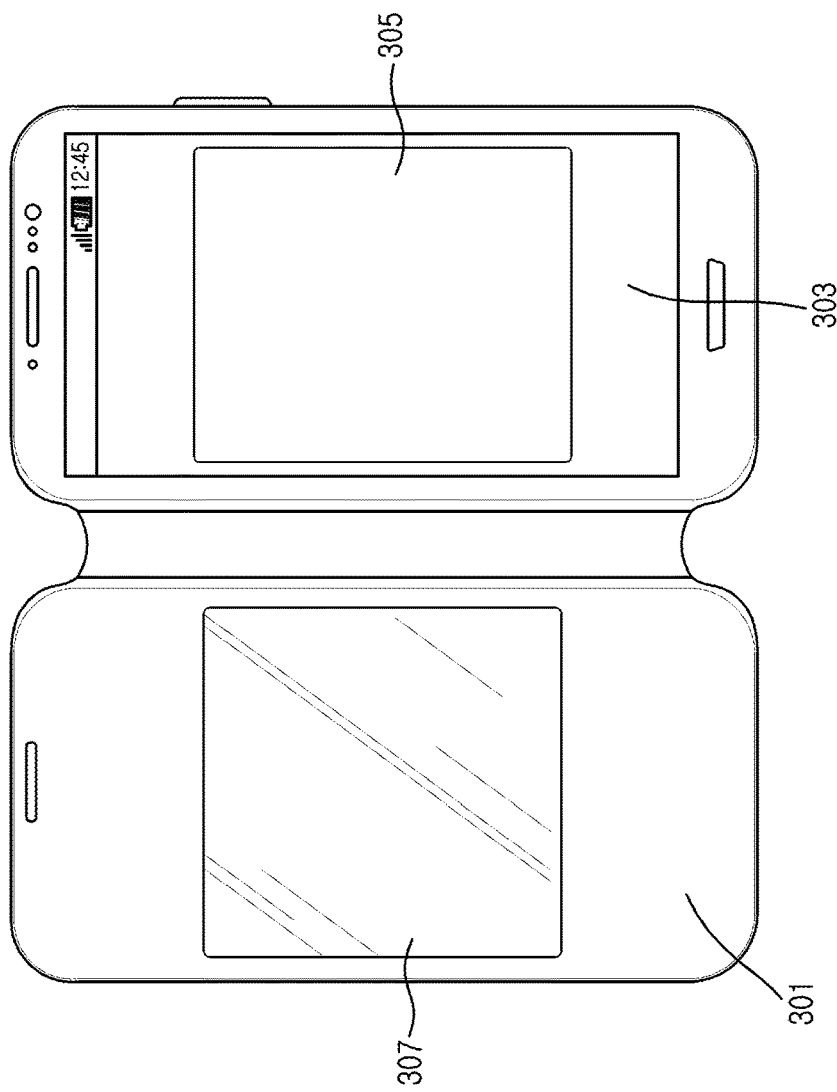
FIG.3B
FIG.3A

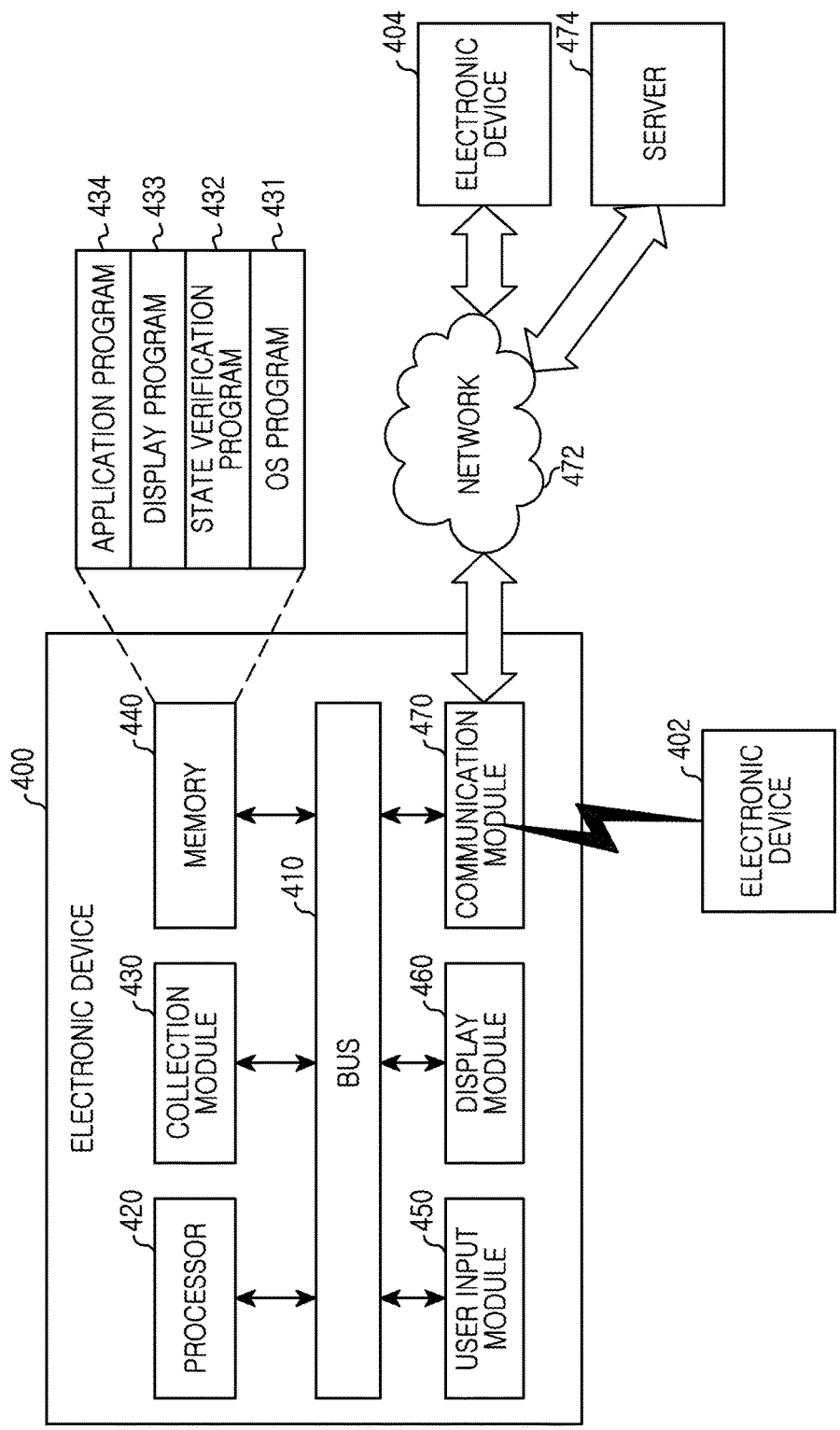

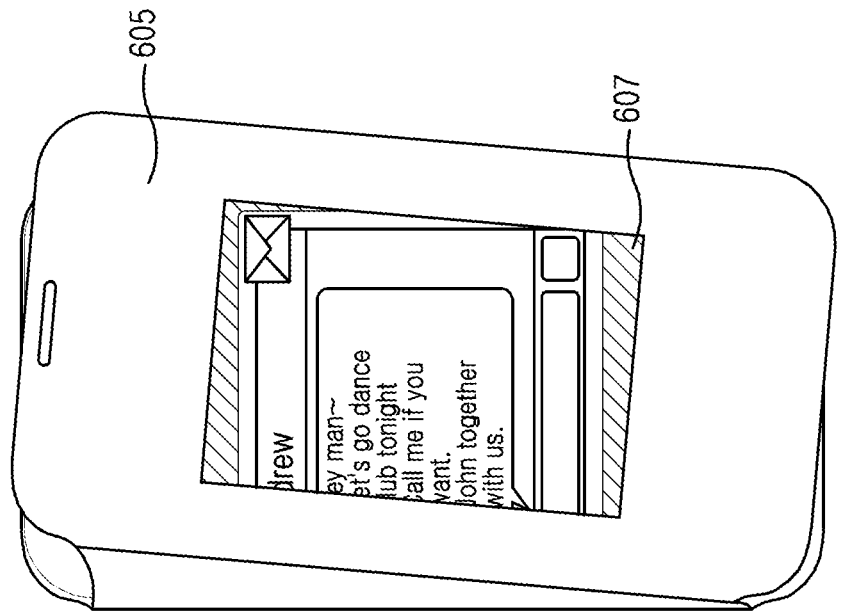
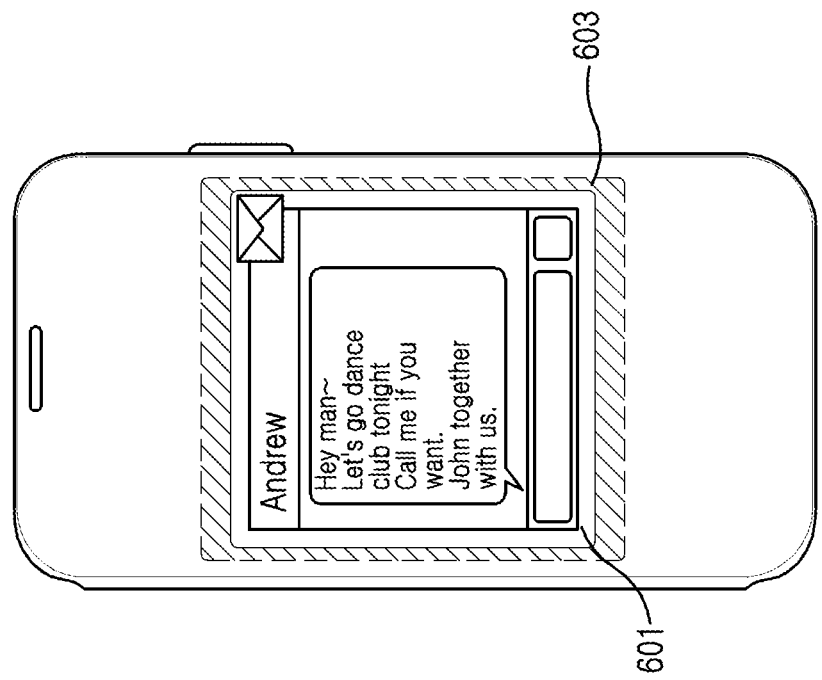

ELECTRONIC DEVICE AND OPERATION METHOD THEREOF

CROSS-REFERENCE TO RELATED APPLICATION(S)

This application claims the benefit under 35 U.S.C. § 119(a) of a Korean patent application filed on Aug. 29, 2013 in the Korean Intellectual Property Office and assigned Serial No. 10-2013-0103307, the entire disclosure of which is hereby incorporated by reference.

TECHNICAL FIELD

The present disclosure relates to an apparatus and a method for operating an electronic device including a cover having a display protection function thereof.

BACKGROUND

As communication technology has advance, electronic devices have tended towards a convergence function and are now able to complexly perform one or more functions.

Electronic devices mainly include mobile terminals classified roughly as the so-called "smart phones". Each of these mobile terminals typically has a large touch screen as a display module and has a high-pixel camera module as well as a basic function for communication with a counterpart. Accordingly, the mobile terminal may capture still and moving pictures. Also, the mobile terminal may reproduce multimedia contents such as music and moving pictures, and may connect to a network and perform web surfing. Such a mobile terminal performs various convergence functions quickly by having a high-performance processor. The mobile terminal is now so advanced as to consider the function of communication with a counterpart as a sub-function.

As described above, the amount of information to be processed and displayed is increasing as the electronic device provides multimedia services. Therefore, there is a growing interest in the electronic device having a touch screen which may improve space utilization and increase the size of the display unit of the electronic device.

The touch screen is an input and display device for inputting and displaying information on one screen. The electronic device may be combined with a cover for protecting the touch screen.

The electronic device may also have a cover for providing a display protection function. A transparent window may be included in at least a part of the cover.

The electronic device may activate a cover window region of a display, corresponding to a size of a transparent window, to output a screen through the transparent window of the cover in a state where the cover is closed.

However, because a size of the cover window region is limited, information output on the cover window region may be limited. For example, when a memo application is executed through the cover window region, only written memo contents may be output on the cover window region. Hence, there may be a problem in that a type of an application which is being currently executed may be not expressed intuitively.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for outputting a cover window region for expressing at least one of context information or attribute information of an application in a state where a cover is closed.

In accordance with another aspect of the present disclosure, the cover window region may be a partial region of a display corresponding to a transparent window of a cover.

In accordance with an aspect of the present disclosure, an operation method of an electronic device is provided. The operation method includes acquiring at least one of context information and attribute information of an application according to whether the cover is closed, and displaying an object related to the acquired information on a region which is included or is not included in a region corresponding to the cover window of a display of the electronic device.

In accordance with another aspect of the present disclosure, an electronic device is provided. The electronic device includes a display, a cover, openably installed to cover at least a part of the display, including a cover window, and a processor configured to apply a frame to a region corresponding to the cover window of the display according to whether the cover is closed.

In accordance with another aspect of the present disclosure, a computer-readable medium is provided. The computer-readable medium having stored thereon one or more programs comprising instructions for allowing a first electronic device to perform the method of acquiring at least one of context information and attribute information of an application according to whether a cover is closed and displaying an object related to the acquired information on a region which is included or is not included in a region corresponding to the cover window of a display, when the instructions will be executed by the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B illustrate a process of displaying a cover window region in an electronic device according to an embodiment of the present disclosure;

FIG. 4 is a block diagram illustrating configurations of an electronic device according to an embodiment of the present disclosure;

FIGS. 6A and 6B illustrate screens of an electronic device which displays a cover window region according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
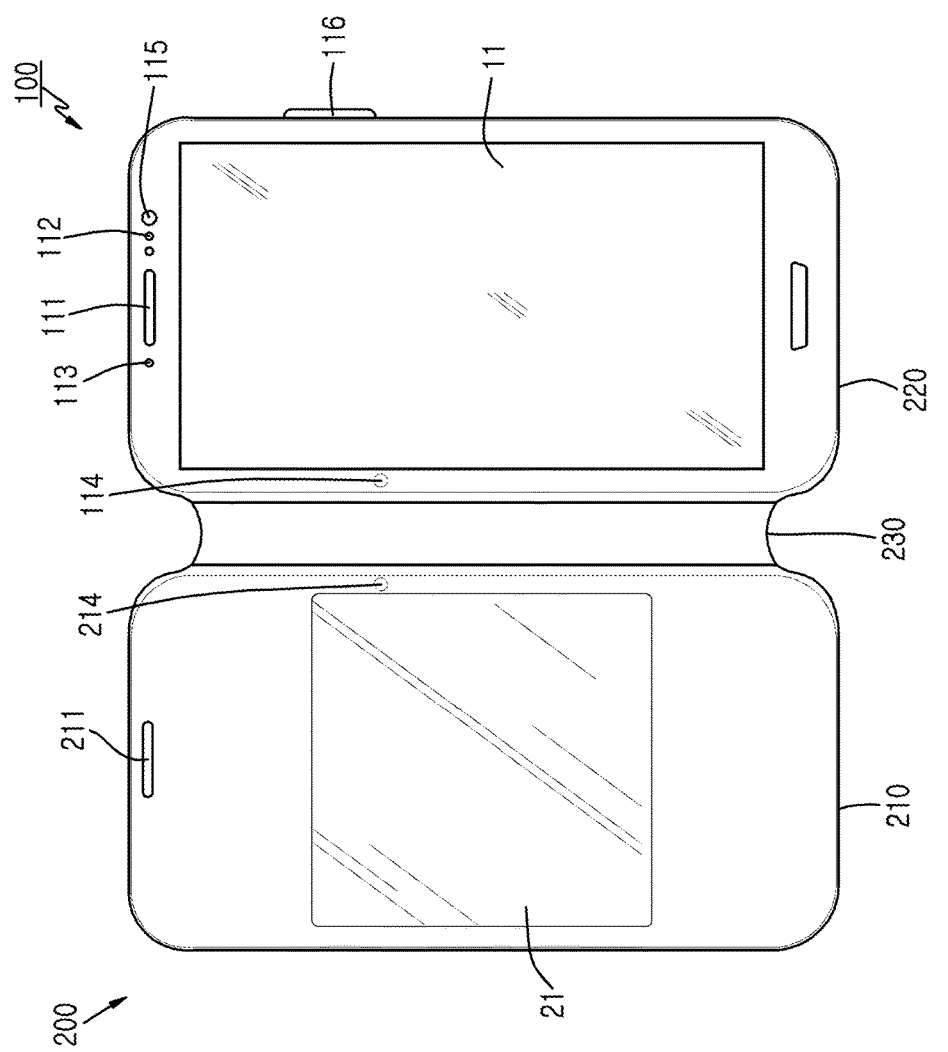
FIGS. 1 and 2 are perspective views illustrating an electronic device in a state where the electronic device is combined with a cover according to an embodiment of the present disclosure.
Figure 2:
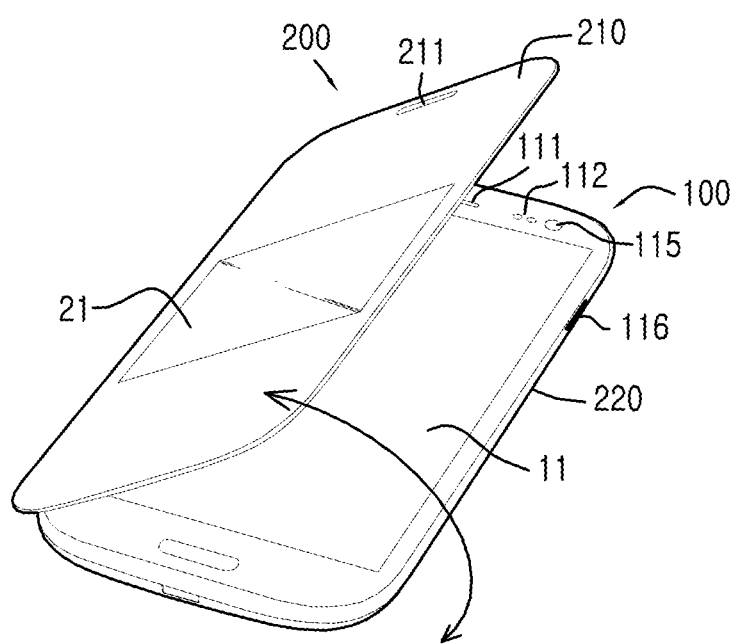

FIGS. 1 and 2 are perspective views illustrating an electronic device in a state where the electronic device is combined with a cover according to an embodiment of the present disclosure.

Referring to FIGS. 1 and 2, the cover 200 may have a display protection function. The cover 200 may have a second cover part 220 which may form a rear surface of the electronic device 100. The cover 200 may have a first cover part 210 which may open and close a front surface of the electronic device 100, such as by a rotation of the first cover part 210 with respect to the second cover part 220.

A touch screen 11, a speaker 111, a proximity or gesture sensor 112, a Red, Green, Blue (RGB) sensor 113, a hall sensor 114, and a camera 115 may be disposed in a front surface of the electronic device 100. Further, a button 116 may be disposed on a side surface of the electronic device 100. The cover 200 may include a connecting part 230 for connecting the first cover part 210 with the second cover part 220. The connecting part 230 may cover one side surface (a surface which connects the front surface of the electronic device 100 with a rear surface of the electronic device 100). The first cover part 210 of the cover 200 may have a through hole 211 corresponding to the speaker 111 of the electronic device 100. The first cover part 210 of the cover 200 may have a magnet 214 corresponding to the hall sensor 114 of the electronic device 100. The first cover part 210 of the cover 200 may have a transparent window 21.

The electronic device 100 may identify the opening and closing of the first cover part 210 of the cover 200 from information detected through at least one sensor (e.g., the proximity or gesture sensor 112, the hall sensor 114, etc.). In accordance with an embodiment of the present disclosure, when the first cover part 210 of the cover 200 is closed, the hall sensor 114 of the electronic device 100 responds to the magnet 214 of the first cover part 210.

The electronic device 100 may control display (e.g., illumination, powering-on, etc.) of its screen in response to the opening and closing of the first cover part 210 of the cover 200. In accordance with an embodiment of the present disclosure, when the cover 200 is closed (the first cover part 210 covers a touch surface (the touch screen 11) of the electronic device 100), the electronic device 100 may activate a cover window region corresponding to a size or position of the transparent window 21 of the cover 200. Herein, the cover window region may be a region having a pop-up or layer type output to the touch screen 11 of the electronic device 100.

In accordance with an embodiment of the present disclosure, the cover window region may include a previously defined menu. In accordance with another embodiment of the present disclosure, the electronic device 200 may sense input to the transparent window 21 of the first cover part 210 and output an execution screen of a menu selected by the input through the cover window region.

The electronic device 100 may apply an object to the cover window region based on at least one of context information and attribute information of an application. Herein, the object applied to the cover window region may express verified context information or attribute information of an executed application in a state where the first cover part 210 is closed.

In accordance with an embodiment of the present disclosure, the electronic device 100 may apply an object to at least a part of the cover window region based on at least one of weather information, position information, screen brightness information, battery information, a kind of an application, a level of the application, an execution state of the application, and the like. In accordance with an embodiment of the present disclosure, the object may be a frame which may be applied to an edge of the cover window region. In accordance with an embodiment of the present disclosure, the electronic device 100 may display a frame on a predetermined region along an edge of the cover window region. In accordance with an embodiment of the present disclosure, the electronic device 100 may display an inner frame in the cover window region or dispose an outer frame out of the cover window region.

The electronic device 100 may inactivate the cover window region in response to the opening of the first cover part 210.

The touch screen 11 of the electronic device 100 may include a touch panel or a pen sensor (digitizer). The electronic device 100 may sense a touch gesture through a set display region and control its display in response to the touch gesture. The electronic device 100 may adjust touch sensitivity according to whether the first cover part 210 is closed. For example, when the first cover part 210 is closed, the electronic device 100 may adjust touch sensitivity and execute a mode about a hovering touch. In a state where the first cover part 210 is closed, a user of the electronic device 100 may perform a touch gesture (e.g., a single touch, a multi-touch, a drag or flicking, etc.) about operation control on a surface of the window 21 of the first cover part 210.

FIGS. 3A and 3B illustrate a process of displaying a cover window region in an electronic device according to an embodiment of the present disclosure.

Referring to FIGS. 3A and 3B, an electronic device may be combined with a cover 301 having a display protection function. In accordance with an embodiment of the present disclosure, the cover 301 may include a window 307 to allow a user of the electronic device to verify a rear surface of the cover 301. In accordance with an embodiment of the present disclosure, the window 307 of the cover 301 may have be transparent or semi-transparent.

The electronic device may activate a cover window region 305 of a touch screen 303. In an embodiment, the cover window region 305 may be a partial region of the touch screen 303. In accordance with an embodiment of the present disclosure, when the cover 301 hides the touch screen 303 after being closed, the electronic device may activate the cover window region 305. In accordance with an embodiment of the present disclosure, the electronic device may output the cover window region 305 on the touch screen 303 corresponding to a position and size of the window of the cover 301.

The electronic device may include a menu or a menu execution screen for controlling its functions in the cover window region 305. The electronic device may apply an object related to at least one of context information and attribute information of an application to at least a part of the cover window region 305. In accordance with an embodiment of the present disclosure, the electronic device may display an object using at least one of a color, a shape, a pattern, a size, a text, an image, etc. on at least a part of the cover window region 305.

As shown in FIGS. 3A and 3B, when the cover 301 is closed, the electronic device may activate the cover window region 305 including a menu and an object for controlling at least one on the touch screen 303. A user of the electronic device may verify a menu and context information or attribute information of an application, which is included in the cover window region 305, intuitively through the window 307 of the closed cover 301.

FIG. 4 is a block diagram illustrating a configuration of an electronic device according to an embodiment of the present disclosure.

The electronic device according to various embodiments of the present disclosure may be a device including a communication function. For example, the electronic device may be one or combination of one or more of various devices, such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG) layer 3 (MP3) player, a mobile medical device, an electronic bracelet, an electronic necklace, electronic accessories, a camera, a wearable device, an electronic clock, a wristwatch, smart white appliances (e.g., a refrigerator, an air conditioner, a cleaner, a cybot, a TeleVision (TV), a Digital Versatile Disc (DVD) player, an audio, an oven, a microwave oven, a washing machine, an air cleaner, an electronic picture frame, etc.), various medical devices (e.g., a Magnetic Resonance Artery (MRA), a Magnetic Resonance Imaging (MRI), a Computed Tomography (CT), an imaging apparatus, a ultrasonic machine, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, electronic equipment for ship (e.g., a navigation device for ship, a gyrocompass, etc.), avionics, a security device, electronic clothes, an electronic key, a camcorder, a game console, a Head Mounted Display (HMD), a flat panel display, an electronic album, a part of furniture or a building/structure including a communication function, an electronic board, an electronic signature receiving device, or a projector. It is obvious to a person skilled in the art that the electronic device according to an embodiment of the present disclosure is not limited to the above-described devices.

Referring to FIG. 4, the electronic device 400 may include a bus 410, a processor 420, a collection module (information collection module) 430, a memory 440, a user input module 450, a display module 460, and/or a communication module 470.

The bus 410 may be a circuit which may connect the above-described components with each other and transmit communication (e.g., a control message) between the components.

The processor 420 may receive, for example, commands from the above-described other components (e.g., the collection module 430, the memory 440, the user input module 450, the display module 460, the communication module 470, etc.) through the bus 410, decode the received commands, and perform a calculation or data processing according to the decoded commands.

In accordance with an embodiment of the present disclosure, the processor 420 may control a cover window region according to whether a cover is closed. In accordance with an embodiment of the present disclosure, when the cover is closed, the processor 420 may activate the cover window region. In accordance with another embodiment of the present disclosure, when the closed cover is opened, the processor 420 may inactivate the activated cover window region. The processor 420 may activate the cover window region on a position which may be exposed through a transparent window of the cover. In accordance with an embodiment of the present disclosure, the processor 420 may activate a cover window region of a pop-up type, a layer type, etc.

The processor 420 may verify context information of a time point when the cover is closed and attribute information of an application executed in a state when the cover is closed. The processor 420 may apply an object which may express at least one of the context information and the attribute information of the application to the activated cover window region.

The collection module 430 may collect information for verifying a state of the electronic device and context information around the electronic device. In accordance with an embodiment of the present disclosure, the collection module 430 may collect context information corresponding to at least one of weather information, position information, screen brightness information, battery information, and the like. In accordance with another embodiment of the present disclosure, the collection module 430 may include sensors (e.g., an image sensor, an illumination sensor, a microphone, a GPS module, etc.) for collecting the context information.

The memory 440 stores commands or data which are received from the processor 420 or other components (e.g., the collection module 430, the user input module 450, the display module 460, the communication module 470, etc.) or are generated by the processor 420 or other components. The memory 440 may include programming modules such as a kernel, middleware, an Application Programming Interface (API), or an application. Herein, the above-described respective programming modules may be composed of software, firmware, hardware, or combination of at least two or more of them.

The kernel may control or manage system resources (e.g., the bus 410, the processor 420, or the memory 440, etc.) used to execute an operation or function implemented in the other programming modules, for example, the middleware, the API, or the application. Also, the kernel may provide an interface which may access a separate component of the electronic device in the middleware, the API, or the application and control or manage the separate component.

The middleware may play a role as a go-between such that the API or the application communicates with the kernel and transmits and receives data with it. Also, the middleware may perform load balancing for work requests using a method of assigning priority which may use system resources (e.g., the bus 410, the processor 420, the memory 440, etc.) of the electronic device 400 to, for example, execute at least one of the plurality of applications, in association with the work requests received from the plurality of applications.

The API is an interface in which the application may control a function provided from the kernel or the middleware. For example, the API may include at least one interface or function for file control, window control, image processing, text control, or the like.

The memory 440 may include a program storing unit for storing programs for controlling operations of the electronic device 400 and a data storing unit for storing data generated while the programs are executed.

In accordance with an embodiment of the present disclosure, the data storing unit may store various rewritable data such as a phone book, an outgoing message, and an incoming message. The data storing unit may store an object corresponding to context information or attribute information of an application In accordance with an embodiment of the present disclosure, the program storing unit may include an Operating System (OS) program 431, a state verification program 432, a display program 433, and at least one application program 434.

The OS program 431 may include several software components for controlling a general system operation. Control of this general system operation may mean, for example, memory control and management, storage hardware (e.g., device) control and management, power control and management, etc. This OS program 431 may perform a function for smoothly communicating between several hardware components (devices) and program components (modules).

The state verification program 432 may include several software components for determining whether the cover is closed. In accordance with an embodiment of the present disclosure, the state verification program 432 may verify a state of the cover using information collected by the collection module 430 and a previously stored threshold value. In accordance with an embodiment of the present disclosure, the state verification program 432 may verify a state of the cover based on a measurement value measured by a hall sensor which responds to a magnetic object of the cover.

The state verification program 432 may collect context information and attribute information of an application. In accordance with an embodiment of the present disclosure, the context information may include at least one of weather information, position information, screen brightness information, battery information, and the like. In accordance with an embodiment of the present disclosure, the attribute information of the application may include at least one of a kind of the application, a level of the application, an execution state of the application, and the like.

The state verification program 432 may verify an object corresponding to information collected in a state where the cover is closed.

The display program 433 may include several software components for controlling output of a cover window region according to a state of the cover. In accordance with an embodiment of the present disclosure, when the cover is closed, the display program 433 may perform a processing operation to activate the cover window region. Herein, to activate the cover window region may have the same meaning as the cover window region is output on a screen. In accordance with another embodiment of the present disclosure, when the closed cover is opened, the display program 433 may perform a processing operation to inactivate the activated cover window region.

The display program 433 may perform a processing operation to apply an object, for expressing context information of a time point when the cover is closed and attribute information of an application executed in a state where the cover is closed, to the cover window region.

Herein, each of the programs stored in the program storing unit may have a hardware-like configuration. In accordance with an embodiment of the present disclosure, the electronic device may include an OS module, a state verification module, a display module, etc.

The user input module 450 may receive, for example, commands or data from a user of the electronic device 400 and transmit the received commands or data to the processor 420 or the memory 440 through the bus 410.

The display module 460 may display videos, images, data, etc. to the user.

The communication module 470 may perform communication between another electronic device 402 and the electronic device 400 or perform communication between a server 474 or another electronic device 404 and the electronic device 400 through a network 472. The communication module 470 may support a local-area communication protocol (e.g., Wireless-Fidelity (Wi-Fi), BlueTooth (BT), Near Field Communication (NFC), or certain network communication (e.g., the Internet, a Local Area Network (LAN), a Wide Area Network (WAN), a telecommunication network, a cellular network, a satellite network, or a Plain Old Telephone Service (POTS)), etc.). Each of the other electronic devices 402 and 404 may be the same (e.g., the same type) device as the electronic device 400 or a device (e.g., a different type) which is different from the electronic device 400.

Figure 5B:
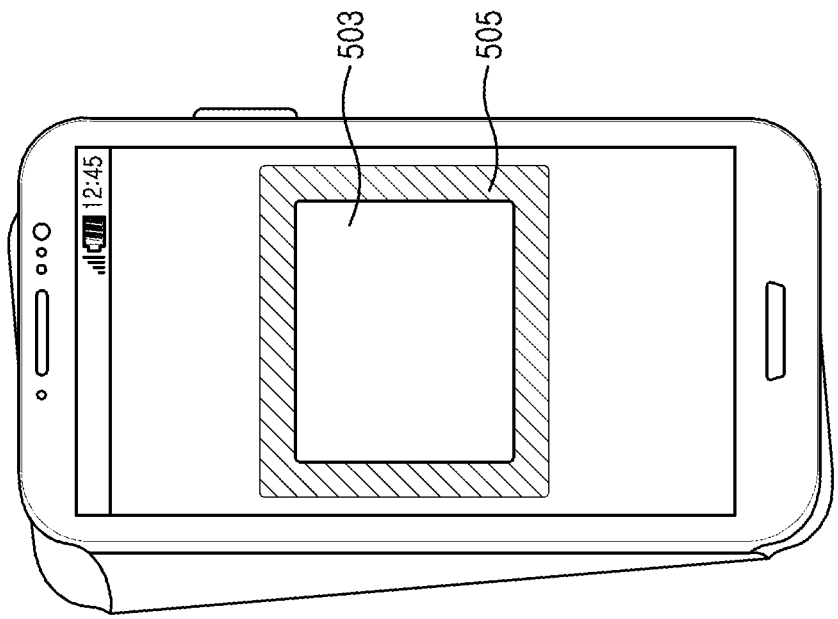
FIGS. 5A and 5B illustrate configurations of a cover window region according to an embodiment of the present disclosure.
Figure 5A:
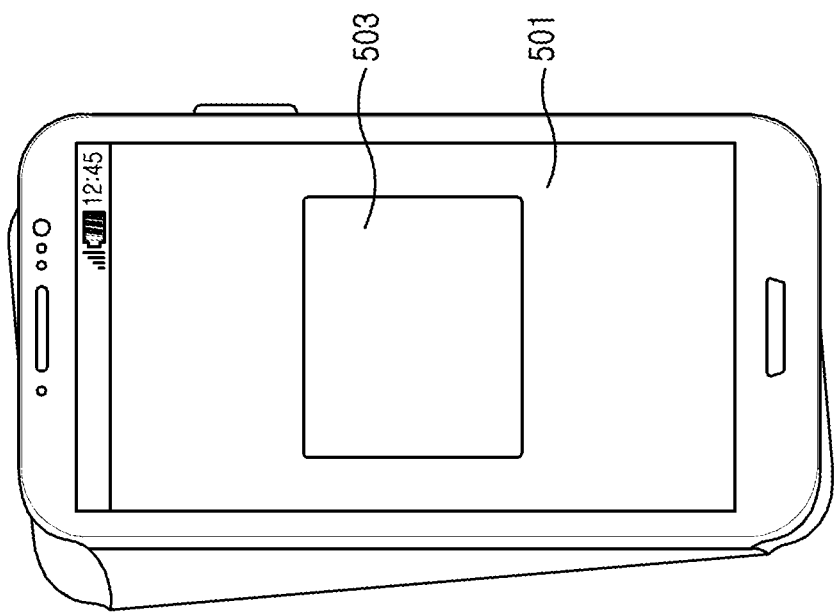

FIGS. 5A and 5B illustrate configurations of a cover window region according to an embodiment of the present disclosure.

Referring to FIGS. 5A and 5B, an electronic device according to various embodiments of the present disclosure may be combined with a cover having a display protection function. The cover may include a transparent window.

The electronic device may output a region (e.g., cover window region 503) corresponding to the transparent window of the cover on a touch screen 501. In accordance with an embodiment of the present disclosure, when the cover hides the touch screen 501 after being closed, the electronic device may activate the cover window region 503 corresponding to the window of the cover. FIGS. 5A and 5B illustrate a state where the cover is opened to describe the cover window region on the touch screen.

The electronic device may output the cover window region 503 on a touch screen region corresponding to a position and size of the transparent window of the cover. The electronic device may apply an object to the cover window region 503 based on at least one of context information and attribute information of an application. In accordance with an embodiment of the present disclosure, the electronic device may apply an object to a region exposed through the transparent window of the cover on the cover window region 503. In accordance with an embodiment of the present disclosure, the electronic device may apply an object to the outside 505 of the cover window region 503 along an edge of the cover window region 503. In accordance with an embodiment of the present disclosure, the object may be a frame for the cover window region 503. In accordance with an embodiment of the present disclosure, the frame for the cover window region 503 may be changed in shape according to context information or attribute information of an application. In accordance with an embodiment of the present disclosure, the shape of the frame for the cover window region 503 may express context information or attribute information of an application using at least one of a color, a shape, a pattern, a size, a text, an image, and the like.

FIGS. 6A and 6B illustrate screens of an electronic device which displays a cover window region according to an embodiment of the present disclosure.

Referring to FIGS. 6A and 6B, the electronic device may activate a cover window region 601 to which an object indicating context information or attribute information of an application is applied in a state where a cover is closed. In accordance with an embodiment of the present disclosure, the electronic device may apply, as shown in FIG. 6A, an object to the outside 603 of the cover window region 601. As shown in FIG. 6A, a region where diagonal lines are drawn on the cover may be an object applied to the activated cover window region 601 on a touch screen of the electronic device. This indicates a state where the object is not exposed by the cover.

The cover window region 601 may be activated and centered on a region exposed through a transparent window of the cover. An object applied to the outside 603 of the cover window region 601 may not be exposed through the transparent window.

A position or direction of the cover of the closed state may be changed by motion, a grip state, etc. of a user of the electronic device.

As shown in FIG. 6B, when the cover 605 is normally closed, the activated cover window region may be exposed through the transparent window of the cover 605. Herein, to close the cover 605 normally may mean that the cover 605 is closed in a state where it is identical to a shape of the electronic device.

When the normally closed cover 605 is moved, an activated cover window region may not be normally exposed through a transparent window of the cover 605 corresponding to a change in a position or a direction of the transparent window of the cover 605. In accordance with an embodiment of the present disclosure, an object 607 applied to the outside of a cover window region may be exposed through the transparent window of the cover 605 instead of the cover window region for a region corresponding to a movement or direction of the cover 605.

In accordance with various embodiments of the present disclosure, a user of the electronic device may verify context information and attribute information of an application using an object exposed by a change in the position or direction of the cover by an effect in which the object applied to the cover window region expresses the context information or the attribute information of the application.

Figure 7B:
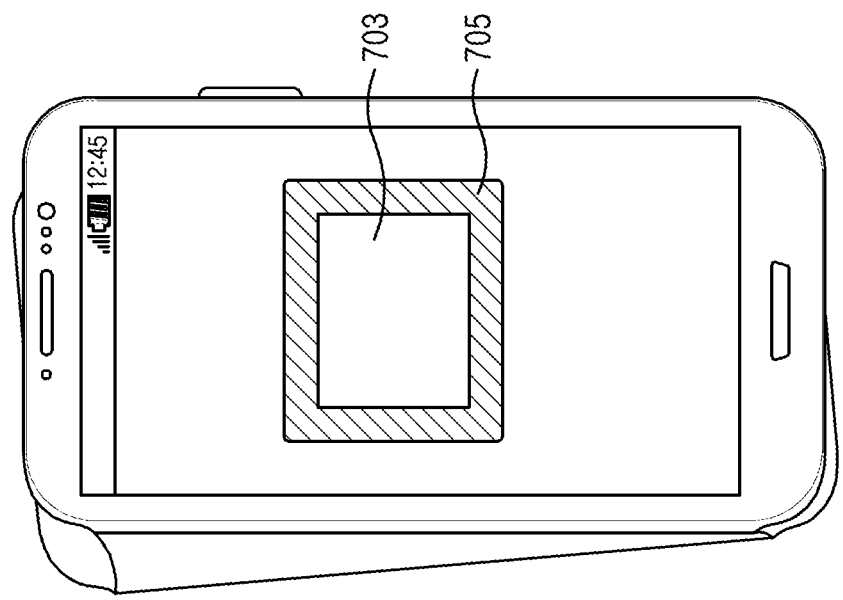
FIGS. 7A and 7B illustrate configurations of a cover window region according to an embodiment of the present disclosure.
Figure 7A:
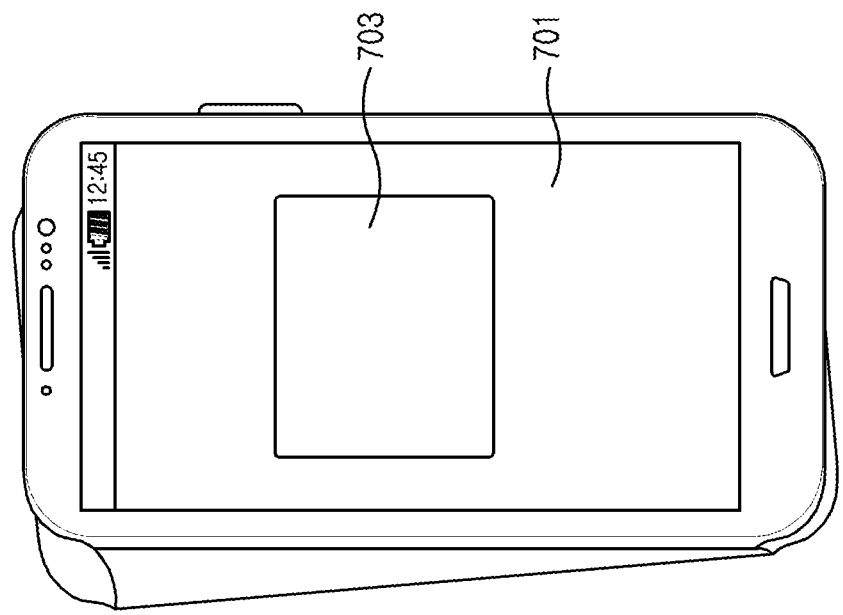

FIGS. 7A and 7B illustrate configurations of a cover window region according to an embodiment of the present disclosure.

Referring to FIGS. 7A and 7B, an electronic device according to various embodiments of the present disclosure may be combined with a cover having a display protection function. The cover may include a transparent window.

The electronic device may activate a cover window region 703 on a partial region on a touch screen 701. In accordance with an embodiment of the present disclosure, when the cover hides the touch screen 701 after being closed, the electronic device may activate the cover window region 703. FIGS. 7A and 7B illustrate a state where the cover is opened to describe the cover window region on the touch screen.

The electronic device may output the cover window region 703 corresponding to a position and size of the transparent window of the cover. The electronic device may apply an object to the cover window region 703 based on at least one of context information and attribute information of an application. In accordance with an embodiment of the present disclosure, the electronic device may apply an object to a part of a region exposed through the transparent window of the cover on the cover window region 703. In accordance with an embodiment of the present disclosure, the electronic device may apply an object to the inside 705 of the cover window region 703 along an edge of the cover window region 703. In accordance with an embodiment of the present disclosure, the object may be a frame for the cover window region 703. In accordance with an embodiment of the present disclosure, the frame for the cover window region 703 may be changed in shape according to context information or attribute information of an application. In accordance with an embodiment of the present disclosure, the shape of the frame for the cover window region 703 may express context information or attribute information of an application using at least one of a color, a shape, a pattern, a size, a text, an image, and the like.

Figure 8:
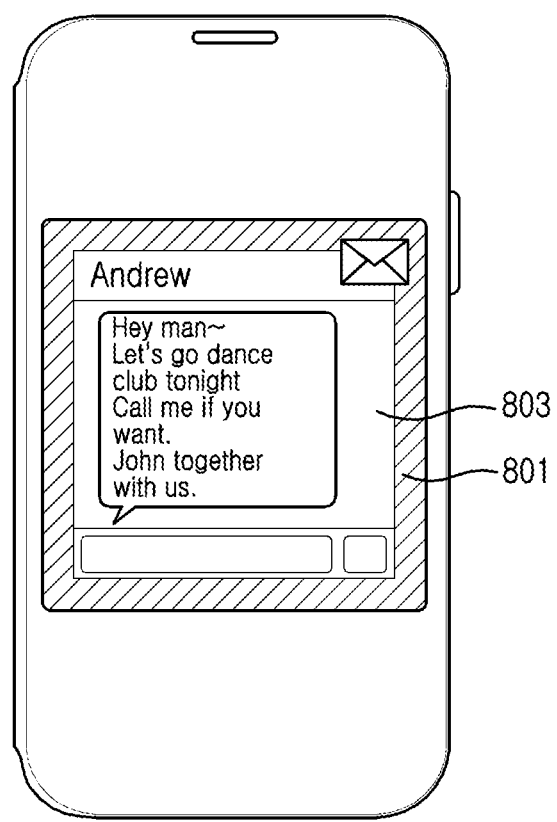
FIG. 8 illustrates a screen of an electronic device which displays a cover window region according to an embodiment of the present disclosure.

FIG. 8 illustrates a screen of an electronic device which displays a cover window region according to an embodiment of the present disclosure.

Referring to FIG. 8, the electronic device may activate a cover window region to which an object indicating context information or attribute information of an application is applied in a state where a cover is closed. In accordance with an embodiment of the present disclosure, the electronic device may apply, as shown in FIG. 8, an object 801 to the inside of the cover window region. The cover window region may be activated centered on a region exposed through a transparent window of the cover. The object 801 applied to the inside of the cover window region may be exposed through the transparent window.

In accordance with various embodiments of the present disclosure, a user of the electronic device may verify context information and attribute information of an application using an object exposed by a change in the position or direction of the cover by an effect in which the object 801 applied to the cover window region expresses the context information or the attribute information of the application.

In accordance with an embodiment of the present disclosure, as shown in FIG. 8, when a message application 803 is executed on the cover window region, the electronic device may expose the object 801 which may express the execution of the message application 803 intuitively through the transparent window of the cover.

Figure 9:
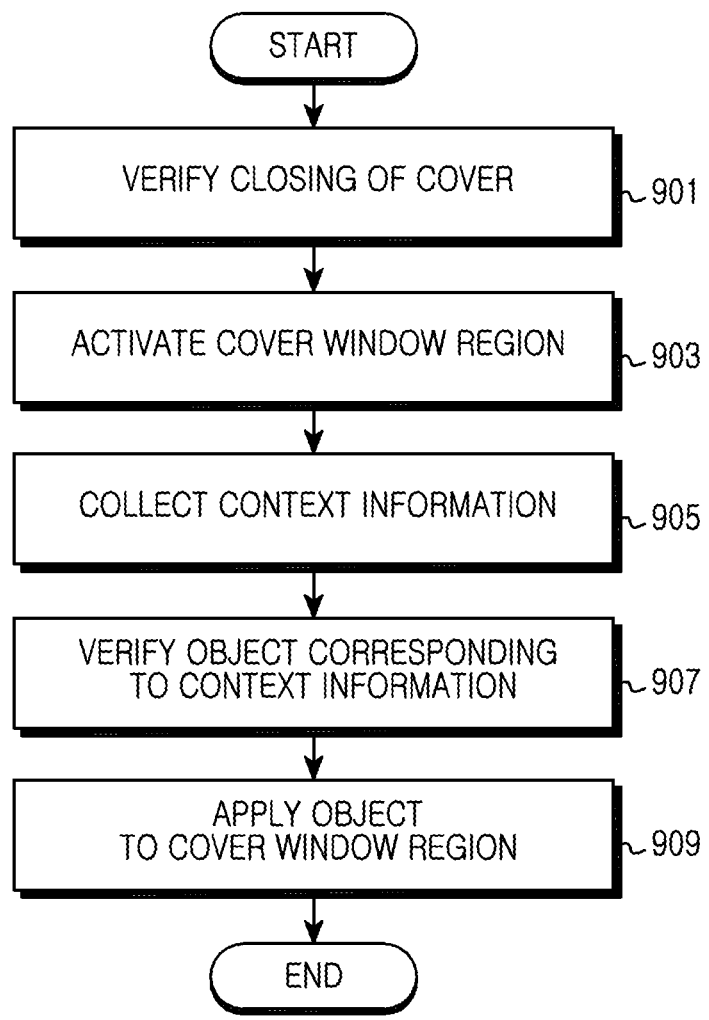
FIG. 9 is a flowchart illustrating an operation process of an electronic device according to an embodiment of the present disclosure.

FIG. 9 is a flowchart illustrating an operation process of an electronic device according to an embodiment of the present disclosure.

Referring to FIG. 9, the electronic device may verify the closing of a cover in operation 901. In accordance with an embodiment of the present disclosure, the electronic device may be combined with a cover having a display protection function and the cover may include a transparent window. The cover may include magnetic materials. The electronic device may include a hall sensor which responds to magnetism.

When the closing of the cover is verified, the electronic device may activate a cover window region in operation 903. Herein, the cover window region may be a region of a display which may be exposed through the transparent window of the cover in a state where the cover is closed. In accordance with an embodiment of the present disclosure, the cover window region may be output which may be exposed through the transparent window of the cover.

The cover window region may include previously defined menus. In accordance with another embodiment of the present disclosure, the electronic device may include an execution screen of a menu for input among the previously defined menus on the cover window region. In accordance with another embodiment of the present disclosure, a screen before the cover is closed is resized and included in the cover window region.

The electronic device may collect context information in operation 905. In accordance with an embodiment of the present disclosure, the electronic device may collect at least one of weather information, position information, screen brightness information, battery information as the context information, and the like.

The electronic device may verify an object corresponding to the context information in operation 907. In accordance with an embodiment of the present disclosure, the electronic device may store an object which may express current weather, weather for the week, weather of a specific area, etc. intuitively and verify an object corresponding to currently collected context information. In accordance with an embodiment of the present disclosure, the electronic device may store an object for context such as cloudy weather, context such as clear weather, context such as rainy weather, and context such as it snow, with respect to the weather information. The electronic device may store an object for a country, a land mark of each country, etc. with respect to the position information. The electronic device may store an object for a screen brightness degree and the remaining capacity degree of a battery of the electronic device. In accordance with an embodiment of the present disclosure, the electronic device may use a frame to be applied to edges of a cover window region as an object for context information. In accordance with an embodiment of the present disclosure, the frame may express context information using at least one of a color, a shape, a pattern, a size, a text, an image, and the like.

The electronic device may apply the object corresponding to the context information to at least a part of the cover window region in operation 909. In accordance with an embodiment of the present disclosure, when it is verified that a current position corresponds to a landmark of a specific country, the electronic device may apply a frame with a landmark in the background to an edge of the cover window region and allow a user of the electronic device to recognize current position context intuitively.

The electronic device according to various embodiments of the present disclosure may apply the object to the inside or outside of the cover window region along edges of the cover window region. In accordance with an embodiment of the present disclosure, the electronic device may set a resolution for the cover window region to use a region to which an object is not applied on the cover window region as an output region.

Figure 10C:
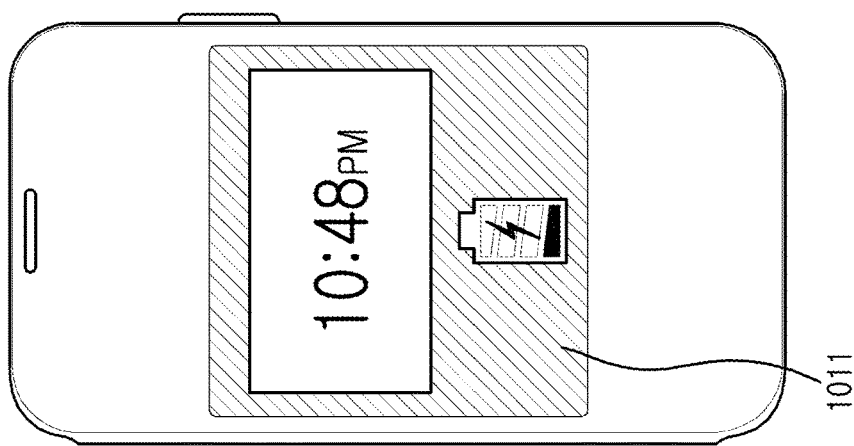
FIGS. 10A, 10B, and 10C illustrate a cover window region to which an object according to context information is applied according to an embodiment of the present disclosure.
Figure 10B:
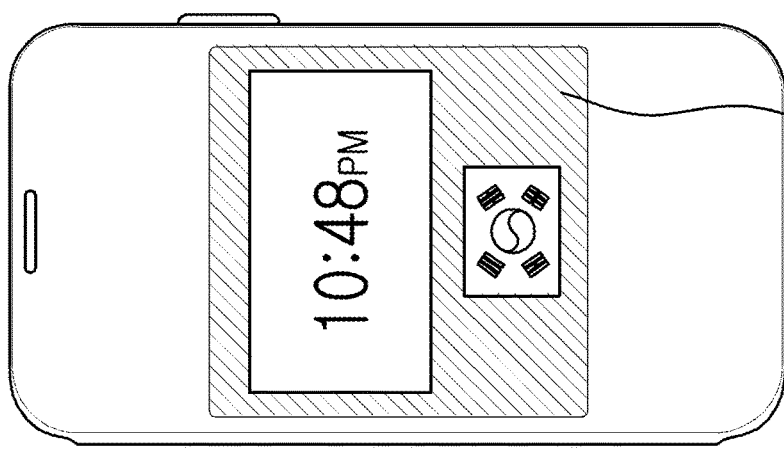
Figure 10A:
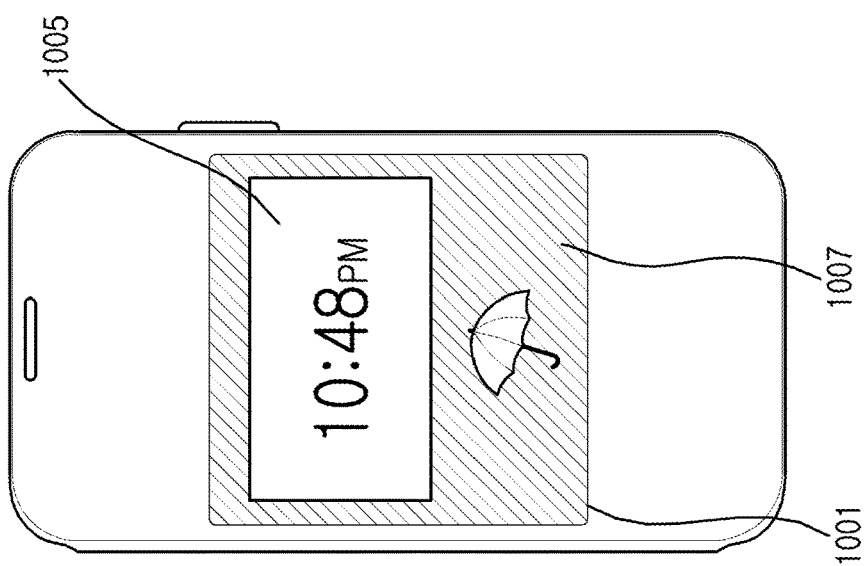

FIGS. 10A to 10C illustrate a cover window region to which an object according to context information is applied according to an embodiment of the present disclosure.

Referring to FIGS. 10A to 10C, the electronic device may collect at least one of weather information, position information, screen brightness information, battery information as context information, and the like.

The electronic device may apply an object corresponding to context information of a time point when a combined cover is closed to a cover window region. In accordance with an embodiment of the present disclosure, the electronic device may collect context information at previously defined periods irrespective of the closing of the cover. In accordance with another embodiment of the present disclosure, the electronic device may collect context information at a time point when an opened cover is closed.

The electronic device may previously store an object corresponding to context information. In accordance with an embodiment of the present disclosure, the object may be generated or edited through an editing process of a user of the electronic device. In accordance with an embodiment of the present disclosure, the electronic device may sense input of the user and define an object corresponding to context information.

As shown in FIG. 10A, the electronic device may activate a cover window region 1005 at a time point when the cover is closed and expose the cover window region 1005 through a transparent window 1001 of the cover.

In accordance with an embodiment of the present disclosure, as shown in FIG. 10A, the electronic device may verify weather for a time point when the cover is closed and apply an object 1007 which may express the verified weather to the activated cover window region. In accordance with an embodiment of the present disclosure, the electronic device may apply an icon (e.g., an umbrella icon, a cloud icon, etc.) which may express the verified weather to the activated cover window region. In accordance with an embodiment of the present disclosure, as shown in FIG. 10A, the electronic device may apply an object to the inside of the activated cover window region and expose the object through a transparent window of a closed cover.

In accordance with an embodiment of the present disclosure, as shown in FIG. 10B, the electronic device may verify a position for a time point when the cover is closed and apply an object 1009 which may express the verified position to an activated cover window region. FIG. 10B illustrates that a cover window region to which an object indicating that a user of the electronic device is located in Korea is applied is exposed through a transparent window of the cover.

In accordance with an embodiment of the present disclosure, as shown in FIG. 10C, the electronic device may verify the remaining capacity of its battery at a time point when the cover is closed and apply an object 1011 which may express the remaining capacity of the battery to an activated cover window region. FIG. 10C illustrates the cover window region to which an object indicating that it is necessary to charge the battery because the remaining capacity of the battery is insufficient is applied is exposed through the transparent window of the cover.

Figure 11:
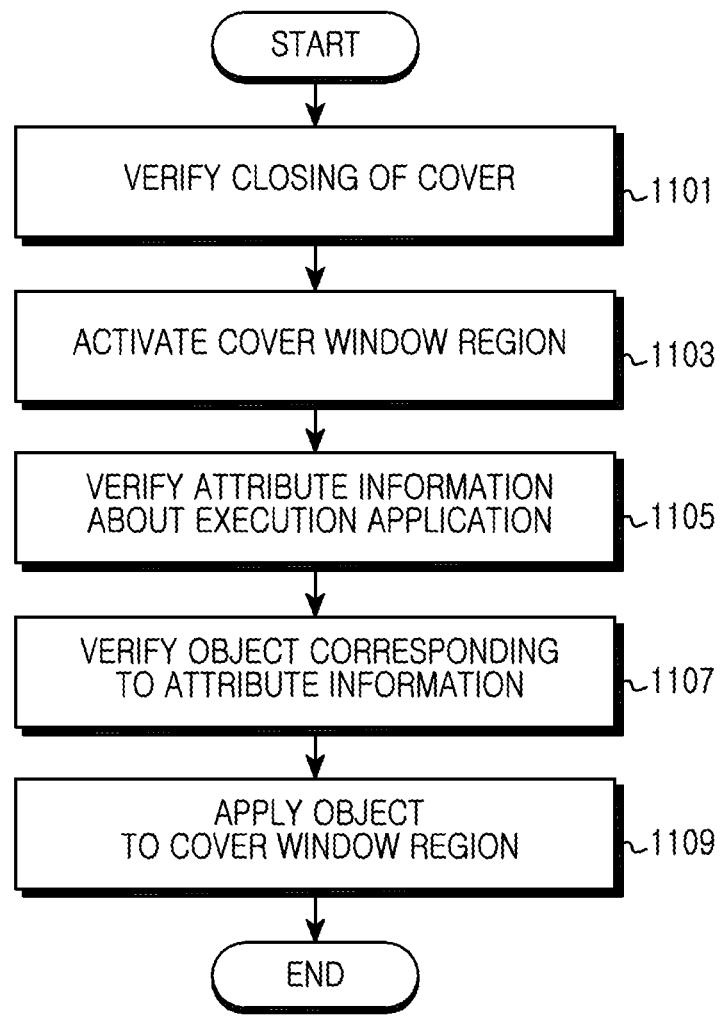
FIG. 11 is a flowchart illustrating an operation process of an electronic device according to an embodiment of the present disclosure.

FIG. 11 is a flowchart illustrating an operation process of an electronic device according to an embodiment of the present disclosure.

Referring to FIG. 11, the electronic device may verify the closing of a cover in operation 1101. In accordance with an embodiment of the present disclosure, the cover may be a cover having a display protection function of the electronic device. In accordance with an embodiment of the present disclosure, the electronic device may determine whether the cover is closed based on response of a sensor to magnetism of the cover.

When the closing of the cover is determined, the electronic device may activate a cover window region in operation 1103. Herein, the cover window region may be a screen which may be exposed through a transparent window of the cover in a state where the cover is closed. In accordance with an embodiment of the present disclosure, the cover window region may be output which may be exposed through the transparent window of the cover.

The cover window region may include previously defined menus. The electronic device may sense input to the transparent window of the cover and execute an application included in the cover window region.

The electronic device may verify attribute information about the execution application in operation 1105. In accordance with an embodiment of the present disclosure, the electronic device may verify at least one of a kind of the application, a level of the application, and an execution state of the application as the attribute information of the application.

The electronic device may verify an object corresponding to the attribute information in operation 1107. In accordance with an embodiment of the present disclosure, the electronic device may store an object which may express a kind of an application, a level of the application, an execution state of the application, etc. intuitively and verify an object for attribute information of an application which is being executed. In accordance with an embodiment of the present disclosure, the electronic device may store objects for types such as a camera, a message, multimedia play, and the like and store an object for a level of multimedia contents.

The electronic device may apply the object corresponding to the attribute information to at least a part of the cover window region in operation 1109. In accordance with an embodiment of the present disclosure, when it is verified that a message application is executed, the electronic device may apply a frame which expresses execution of a message to an edge of the cover window region and allow a user of the electronic device to recognize a type of a current execution application intuitively.

FIGS. 12A to 12D illustrate a cover window region to which an object according to attribute information of an application is applied according to an embodiment of the present disclosure.

Referring to FIGS. 12A to 12D, the electronic device may verify at least one of a kind of an application, a level of the application, an execution state of the application, and the like as attribute information of the application.

The electronic device may apply an object corresponding to attribute information of an application executed at a time point when a cover is closed to a cover window region.

The electronic device may activate the cover window region at a time point when the cover is closed and expose the cover window region through a transparent window of the cover.

Figure 12D:
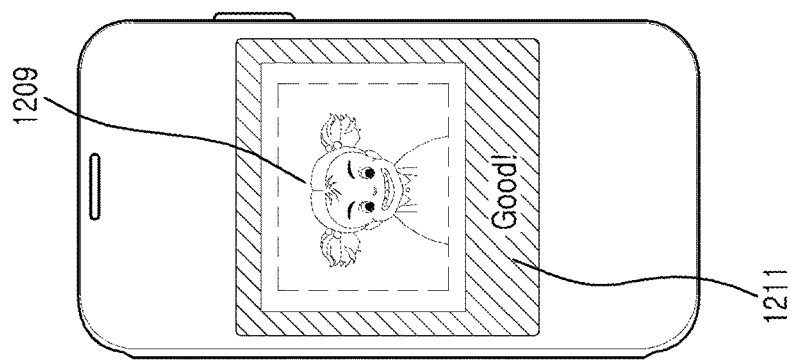
FIGS. 12A, 12B, 12C, and 12D illustrate a cover window region to which an object according to attribute information of an application is applied according to an embodiment of the present disclosure.
Figure 12C:
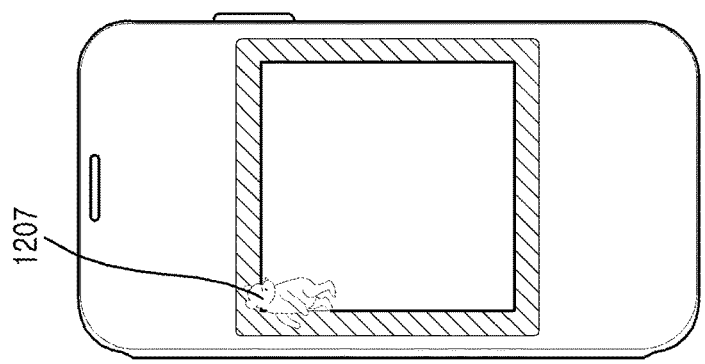
Figure 12B:
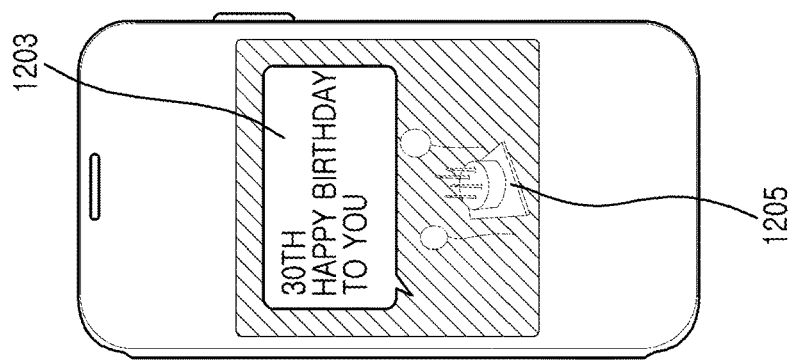
Figure 12A:
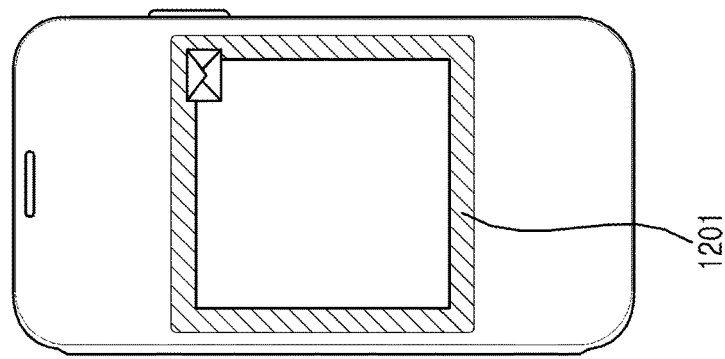

In accordance with an embodiment of the present disclosure, as shown in FIG. 12A, when it is verified that a message application is executed at a time point when the cover is closed, the electronic device may verify an object 1201 which may express the execution of the message application and apply the object 1201 to the activated cover window region. The electronic device may apply a unique object for an executed application to the cover window region.

In accordance with an embodiment of the present disclosure, as shown in FIG. 12B, receiving a message in a state where the cover is closed, the electronic device may verify contents 1203 of the received message and apply an object 1205 which may express the contents of the message to the activated cover window region. The electronic device may recognize a text of the received message and verify an object corresponding to the recognized text.

In accordance with an embodiment of the present disclosure, as shown in FIG. 12C, when it is verified that contents corresponding to a specific level are reproduced at a time point when the cover is closed, the electronic device may apply an object 1207 which may express a level of the reproduced contents and apply the object to the activated cover window region. In accordance with an embodiment of the present disclosure, the object which may express the level of the reproduced contents may include a character corresponding to the level of the contents.

In accordance with an embodiment of the present disclosure, as shown in FIG. 12D, when a specific object 1209 is recognized on a preview screen, the electronic device may apply an object 1211 which may express context in which the object is recognized to the activated cover window region. The electronic device may set a resolution for the cover window region to use a region to which an object is not applied on the cover window region as an output region. As shown in FIG. 12D, the entire preview screen for an image to be included in photographed data by an object applied to an edge of the cover window region may be exposed through a transparent window of the cover. A user of the electronic device may verify photographed data easily to be acquired, verify that a subject is recognized through an object applied to the cover window region, and push a photographing button immediately.

In accordance with an embodiment of the present disclosure, the electronic device may verify camera information such as illumination and color information for a preview screen and apply an object which may express the verified camera information to the activated cover window region.

In accordance with an embodiment of the present disclosure, the electronic device may verify information (e.g., a game ranking, news, etc.) updated through a Social Networking Service (SNS) and apply an object which may express the verified information to the activated cover window region.

In accordance with an embodiment of the present disclosure, the electronic device may verify a genre of reproduced multimedia contents and apply an object which may express the verified genre to the activated cover window region.

Figure 13:
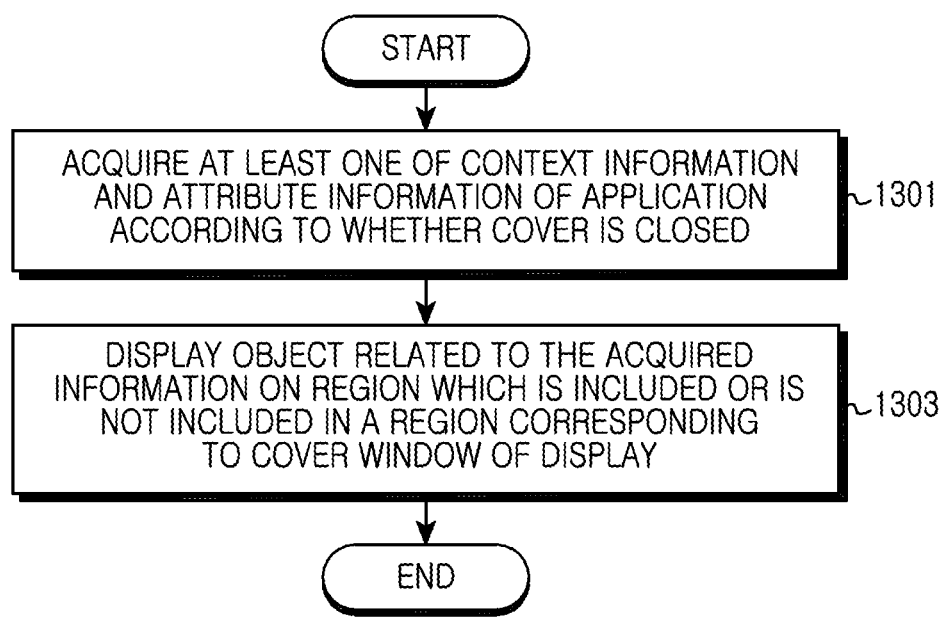
FIG. 13 is a flowchart illustrating an operation of an electronic device according to an embodiment of the present disclosure.

FIG. 13 is a flowchart illustrating an operation of an electronic device according to an embodiment of the present disclosure.

Referring to FIG. 13, the electronic device may perform an operation for acquiring at least one of context information and attribute information of an application according to the closing of a cover in operation 1301.

The electronic device may perform an operation for displaying an object related to the acquired information on a region which is included or is not included in a region corresponding to a cover window of a display in operation 1303. In accordance with various embodiments of the present disclosure, the region included in the region corresponding to the cover window may be the inside of the region corresponding to the window. In accordance with various embodiments of the present disclosure, the region which is not included in the region corresponding to the cover window may be the outside of the region corresponding to the window.

The object may be displayed on a predetermined region along an edge of the region corresponding to the cover window of the display.

The object may be displayed in the region corresponding to the cover window of the display.

The object may be displayed out of the region corresponding to the cover window of the display.

The object may include at least one of a color, a shape, a pattern, a size, a text, an image, and the like.

The context information may include at least one of weather information, position information, screen brightness information, battery information, and the like.

The attribute information of the application may include at least one of a kind of the application, a genre of the application, a level of the application, an execution state of the application, and the like.

In accordance with various embodiments of the present disclosure, the electronic device may set an object corresponding to the context information or the attribute information of the application. In accordance with an embodiment of the present disclosure, when an event for specifying the object is generated, the electronic device may perform a processing operation to provide objects which may be applied to context information or attribute information of an application which may specify the object and define an object corresponding to the context information or the attribute information of the application.

The electronic device may generate or edit an object which may be applied to the context information or the attribute information of the application. In accordance with an embodiment of the present disclosure, the electronic device may perform a processing operation to generate or edit an object using previously stored data (e.g., photographed data, text data, image data, etc.) and data (e.g., photographed data, text data, image data, etc.) newly generated by a user of the electronic device.

The electronic device according to various embodiments of the present disclosure may display an object on a cover window of a display based on at least one of context information and attribute information of an application.

The electronic device according to various embodiments of the present disclosure may use at least one of weather information, position information, screen brightness information, battery information as context information, and the like.

The electronic device according to various embodiments of the present disclosure may use at least one of a kind of an application, a level of the application, an execution state of the application as attribute information of the application, and the like.

The electronic device according to various embodiments of the present disclosure may display an object on a predetermined region along an edge of a cover window of a display.

The electronic device according to various embodiments of the present disclosure may generate or edit an object corresponding to context information or attribute information of an application.

Each of the above-described elements of the electronic device according to various embodiments of the present disclosure may be configured as one or more components. Names of the corresponding elements may differ according to kinds of the electronic devices. The electronic device according to various embodiments of the present disclosure may be configured to include at least one of the above-described elements. Some elements may be omitted from the electronic device or the electronic device may further include additional elements. Also, some of the elements of the electronic device according to various embodiments of the present disclosure are combined to be configured as one entity. Therefore, functions of the corresponding elements before being combined may be equally performed.

The terms used in various embodiments of the present disclosure, for example, the "module" may mean, for example, a unit including one or combination of two or more of hardware, software, or firmware. The term "module" may be interchangeably used with terms such as the unit, the logic, the logical block, the component, or the circuit. The term "module" may be the minimum unit of a component which is integrally configured or some of the minimum unit. The term "module" may be the minimum unit for performing one or more functions or some of the minimum unit. The term "module" may be implemented mechanically or electronically. For example, the term "module" according to various embodiments of the present disclosure may include at least one of an Application-Specific Integrated Circuit (ASIC) chip, Field-Programmable Gate Arrays (FPGAs), or a programmable-logic device, each of them for performing certain operations, which is well known or will be developed in the future.

In accordance with various embodiments of the present disclosure, at least a part of the device (e.g., modules, functions, etc.) or the method (e.g., operations) may be implemented as, for example, an instruction which is stored as a type of a programming module in computer-readable storage media. When the instruction is executed by one or more processors, the one or more processors may perform a function corresponding to the instruction. The computer-readable storage media may be, for example, a memory. At least a part of the programming module may be implemented (e.g., executed) by, for example, the processor. At least a part of the programming module may include, for example, a module, a program, a routine, sets of instructions, or a process, etc., each of them for performing one or more functions.

The computer-readable storage media may include hardware devices which are particularly configured to store and perform program instructions (e.g., program modules), such as magnetic media such as a hard disc, a floppy disc, and a magnetic tape, optical media such as a Compact Disc Read Only Memory (CD-ROM) and a Digital Versatile Disc (DVD), magneto-optical media such as a floptical disk, a ROM, a Random Access Memory (RAM), and a flash memory. Also, the program instruction may include not only a machine language code made by a compiler but also a high-level language code which may be executed by a computer using an interpreter, etc. The above-described hardware device may be configured to operate as one or more software modules to perform operations according to various embodiments of the present disclosure. The opposite may also be configured as the same as being described above.

The module or the programming module according to various embodiments of the present disclosure may include at least one or more of the above-described elements. Some of the elements may be omitted from the module or the programming module or the module or the programming module may further include additional other elements. The module, the programming module, or operations performed by other elements, according to various embodiments of the present disclosure, may be executed by a sequential, parallel, repeated, or heuristic method. Also, some operations may be executed in the different order or be omitted. Other operations may be added to the some operations.

In accordance with various embodiments of the present disclosure, in storage media which store instructions, the instructions are set to allow at least one processor to perform at least one operation when being executed by at least the one processor. At least the one operation may include an operation for acquiring at least one of context information and attribute information of an application according to whether a cover of the electronic device is closed and an operation for displaying an object related to the acquired information on a region which is included or is not included in a region corresponding to a cover window of a display.

The electronic device according to various embodiments of the present disclosure may express current context or a kind of an application which is being executed intuitively by outputting a cover window region which may express at least one of the context information and the attribute information of the application in a state where the cover is closed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method an electronic device comprising a display, the method comprising:
    determining whether a cover is closed or open with respect to the display, wherein the cover comprises a cover window in a part of the cover and the cover window is transparent;
    when it is determined that the cover is open, displaying, on an entire area of the display, a content in a first user interface associated with an application; and
    when it is determined that the cover is closed with respect to the display, displaying, on the display, the content in a second interface associated with the application, and attribute information,
    wherein the content in the second interface is displayed on a part area of the display corresponding to the cover window when the cover is normally closed,
    wherein the attribute information is displayed on a frame area surrounding the part area, and
    wherein the frame area is further displayed on an outside of the part area such that at least part of the frame area is exposed via the cover window when the cover is abnormally closed state in which the cover window does not match to the part area corresponding to the cover window.

2. The method of claim 1, wherein the attribute information is displayed using at least one of a color, a shape, a pattern, a size, a text, and an image.

3. The method of claim 1, further comprising displaying status information on the frame area,
    wherein the status information includes at least one of weather information, position information, screen brightness information, and battery information.

4. The method of claim 1, wherein the attribute information of the application includes at least one of a kind of the application, a genre of the application, a level of the application, and an execution state of the application.

5. The method of claim 1, wherein the cover being closed on the display is detected using a magnetic sensor.

6. An electronic device comprising:
    a memory;
    a display;
    a cover, openably installed to cover the display comprising a cover window in a part of the cover, the cover window being transparent;
    at least one processor; and
    at least one program, wherein the at least one program is stored in the memory and configured to be executed by the at least one processor, the at least one program comprising instructions for:
    determining whether the cover is closed or open with respect to the display,
    when it is determined that the cover is open, displaying, on an entire area of the display, a content in a first user interface associated with an application, and
    when it is determined that the cover is closed with respect to the display, controlling display to display the content in a second interface associated with the application, and attribute information,
    wherein the content in the second interface is displayed on a part area of the display corresponding to an area of the cover window when the cover is normally closed, and
    wherein the attribute information is displayed on a frame area surrounding the part area, and
    wherein the frame area is further displayed on an outside of the part area such that at least part of the frame area is exposed via the cover window when the cover is abnormally closed state in which the cover window does not match to the part area corresponding to the cover window.

7. The electronic device of claim 6, wherein the at least one program further comprises instructions for verifying at least one of status information and the attribute information associated with the application, at a time point when the cover is closed on the display.

8. The electronic device of claim 6, wherein the at least one program further comprises instructions for receiving an event for displaying the contents of the application.

9. The electronic device of claim 6, wherein the at least one program further comprises instructions for controlling display to detect an input for editing the frame area.

10. The electronic device of claim 6, wherein the at least one program further comprises instructions for setting a resolution for the area on which the contents of the application is displayed.

11. The electronic device of claim 7,
wherein the at least one program further comprises instructions for controlling display to display, on the frame area, the status information of the electronic device, and
wherein the status information includes at least one of weather information, position information, screen brightness information, and battery information.

12. The electronic device of claim 8, wherein the attribute information of the application includes at least one of a kind of the application, a genre of the application, a level of the application, and an execution state of the application.

13. The electronic device of claim 8, wherein the at least one program further comprises instructions for controlling the display to display, in response to receiving the event for displaying a received message, the attribute information using a message icon image.

14. The electronic device of claim 8, wherein the at least one program further comprises instructions for controlling display to display, in response to receiving the event for displaying a preview screen of a camera input, the attribute information corresponding to a recognized object in the preview screen.

15. The electronic device of claim 6 further comprising a magnetic sensor configured to determine whether the cover is closed on the display.

16. A non-transitory computer-readable storage medium having stored thereon one or more programs comprising instructions for allowing an electronic device comprising a display to perform a method of:
determining whether a cover is closed or open with respect to the display, wherein the cover comprises a cover window in a part of the cover and the cover window is transparent;
when it is determined that the cover is open, displaying, on an entire area of the display, a content in a first user interface associated with an application; and
when it is determined that the cover is closed with respect to the display, displaying, on the display, the content in a second interface associated with the application, and attribute information,
wherein the content in the second interface is displayed on a part area of the display corresponding to the cover window when the cover is normally closed,
wherein the attribute information is displayed on a frame area surrounding the part area, and
wherein the frame area is further displayed on an outside of the part area such that at least part of the frame area is exposed via the cover window when the cover is abnormally closed state in which the cover window does not match to the part area corresponding to the cover window.

* * * * *